(12) United States Patent
Litalien

(10) Patent No.: US 10,767,511 B2
(45) Date of Patent: Sep. 8, 2020

(54) ANTI-CAVITATION DEVICE FOR OIL DAMPERS

(71) Applicant: PRATT & WHITNEY CANADA CORP., Longueuil (CA)

(72) Inventor: Charles Litalien, Mt. St-Hilaire (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 0 days.

(21) Appl. No.: 16/252,911

(22) Filed: Jan. 21, 2019

(65) Prior Publication Data

US 2020/0232341 A1 Jul. 23, 2020

(51) Int. Cl.
| | |
|---|---|
| *F01D 25/16* | (2006.01) |
| *F16C 27/02* | (2006.01) |
| *F16C 27/04* | (2006.01) |
| *F01D 25/04* | (2006.01) |
| *F16F 15/023* | (2006.01) |

(52) U.S. Cl.
CPC ............ *F01D 25/164* (2013.01); *F16C 27/02* (2013.01); *F16C 27/045* (2013.01); *F16F 15/0237* (2013.01); *F01D 25/04* (2013.01); *F05D 2220/32* (2013.01); *F05D 2240/55* (2013.01); *F05D 2240/58* (2013.01); *F05D 2240/60* (2013.01); *F05D 2260/96* (2013.01); *F16C 2360/23* (2013.01); *F16F 2230/30* (2013.01)

(58) Field of Classification Search
CPC ........ F16C 19/26; F16C 27/02; F16C 27/045; F16C 27/063; F16C 2360/23; F01D 25/164; F01D 25/04; F16F 15/0237; F16F 2230/30; F04D 39/042; F16J 15/3236; F05D 2240/58; F05D 2220/32; F05D 2240/55; F05D 2240/60; F05D 2260/96
USPC ........... 384/99, 94, 114, 119, 140, 147, 477; 248/562; 277/312, 357, 434, 918
See application file for complete search history.

(56) References Cited

U.S. PATENT DOCUMENTS

| | | | | |
|---|---|---|---|---|
| 3,266,855 | A * | 8/1966 | Cleff | F16C 27/02 384/203 |
| 4,602,727 | A * | 7/1986 | Jackson | G01F 11/24 222/368 |
| 4,782,919 | A | 11/1988 | Chalaire et al. | |
| 4,867,655 | A | 7/1989 | Barbic et al. | |
| 4,906,111 | A * | 3/1990 | Martinie | F16C 33/76 384/477 |

(Continued)

FOREIGN PATENT DOCUMENTS

| | | | | |
|---|---|---|---|---|
| DE | 3336514 C1 * | 8/1984 | | F16J 9/061 |
| FR | 2611020 A1 * | 8/1988 | | F04B 39/042 |

*Primary Examiner* — Marcus Charles
(74) *Attorney, Agent, or Firm* — Norton Rose Fulbright Canada LLP

(57) ABSTRACT

The disclosure relates to an anti-cavitation device for impeding gas intrusion into oil dampers that support bearings and a rotating shaft. The oil film damper includes an annulus and a pair of piston rings between a structural support and the bearing housing. The piston rings define the axial boundaries of the oil filled annulus. An oil inlet between the pair of piston rings is in communication with a source of pressurized oil. An oil seal is axially spaced from each piston ring defining an annular oil filled reservoir external to each piston ring. The oil seal acts as a one way check valve to impede gas incursion into the oil reservoir and oil filled annulus.

19 Claims, 3 Drawing Sheets

(56) References Cited

U.S. PATENT DOCUMENTS

| | | | |
|---|---|---|---|
| 5,044,781 A * | 9/1991 | Werner | F16C 27/04 384/99 |
| 5,056,935 A | 10/1991 | Singh | |
| 5,149,206 A * | 9/1992 | Bobo | F01D 25/164 248/562 |
| 5,178,400 A | 1/1993 | Singh | |
| 5,215,384 A * | 6/1993 | Maier | F16C 17/03 384/117 |
| 5,228,784 A * | 7/1993 | Bobo | F16C 27/045 384/487 |
| 5,599,110 A * | 2/1997 | MacKendrick | A62B 17/001 2/2.12 |
| 6,566,774 B2 * | 5/2003 | Parmeter | H02K 5/1672 310/87 |
| 6,872,003 B2 * | 3/2005 | Dusserre-Telmon | F01D 25/164 384/99 |
| 7,066,651 B2 * | 6/2006 | Nicholas | F16C 27/02 384/99 |
| 8,182,153 B2 * | 5/2012 | Singh | F01D 25/164 384/477 |
| 9,011,009 B2 * | 4/2015 | Trotter | B60G 15/067 384/140 |
| 9,334,865 B2 * | 5/2016 | Johnson | F04D 1/06 |
| 9,470,263 B2 | 10/2016 | Savela et al. | |
| 9,835,172 B2 * | 12/2017 | Bucking | F01D 25/12 |
| 10,077,713 B2 | 9/2018 | Gysling et al. | |
| 10,145,380 B1 * | 12/2018 | Davis | F04D 29/041 |
| 10,156,159 B1 * | 12/2018 | Ganiger | F01D 25/164 |
| 2010/0220948 A1 * | 9/2010 | Singh | F01D 25/164 384/477 |

\* cited by examiner

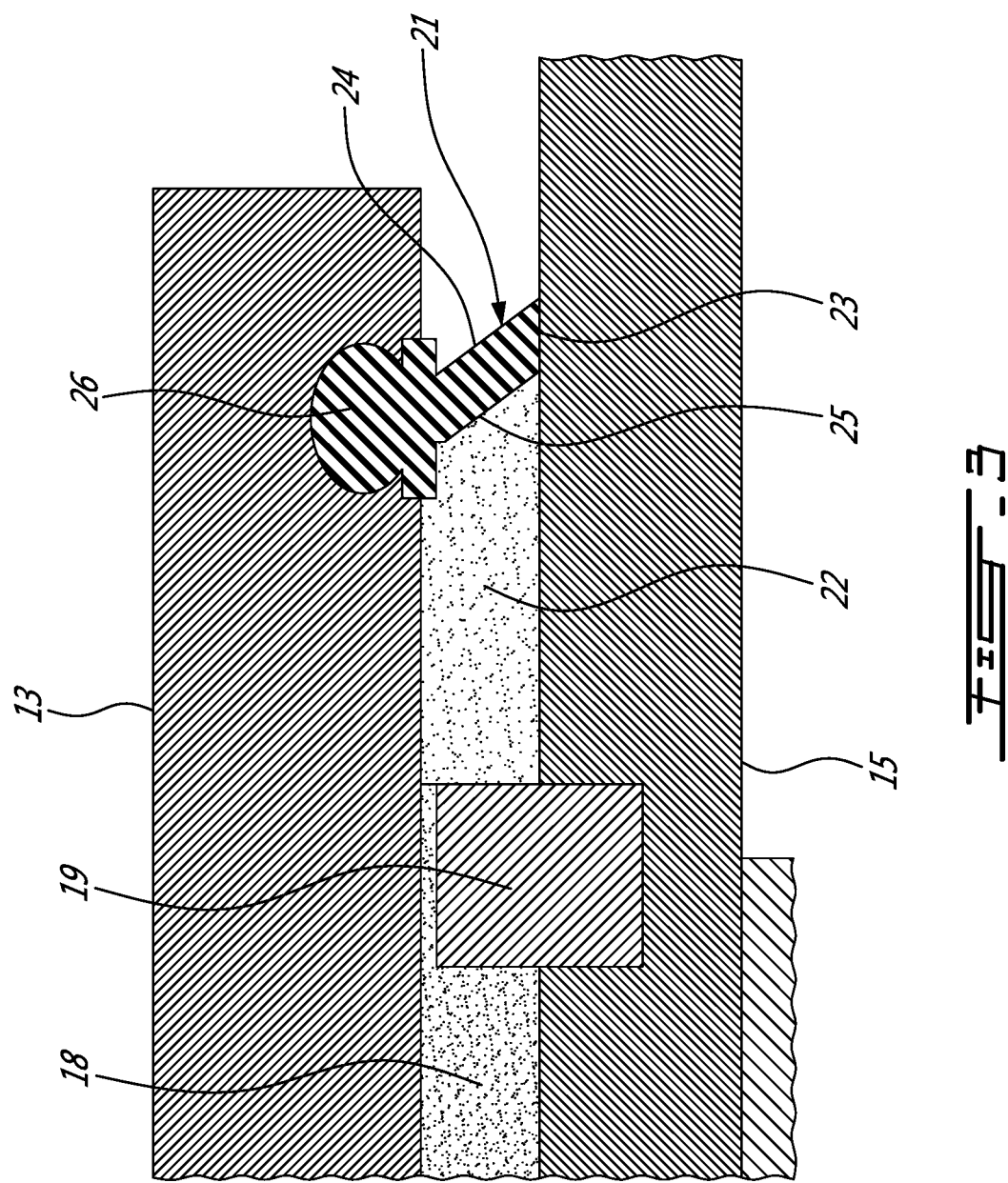

ANTI-CAVITATION DEVICE FOR OIL DAMPERS

TECHNICAL FIELD

The disclosure relates generally to gas turbine engines, and more particularly to an anti-cavitation device for impeding gas intrusion into oil film dampers that support bearings and a rotating shaft.

BACKGROUND

Oil dampers or squeeze film dampers surround the bearing of a rotating shaft with an oil filled annulus. The annulus is supplied with pressurized oil and is defined between a stationary structural support and a radially inward bearing housing while being contained by forward and aft piston rings. The oil damper accommodates radial movement of the shaft, bearings and bearing housing relative to the stationary support where radial movement is caused by shaft imbalance conditions.

Ideally the pressurized oil flows one way from the oil inlet, purges the oil filled annulus and flows out under pressure through restricted gaps about the piston rings. As the shaft rotates under an imbalanced condition, a positive pressure is created in the oil filled annulus in advance of the eccentrically rotating shaft (as the radial dimension of the annulus is squeezed) and a negative pressure follows the eccentrically rotating shaft (as the radial dimension of the annulus increases).

The negative oil pressure relative to ambient gas pressure can draw gas into the oil filled annulus. Gas intrusion into the oil filled annulus through the piston ring gaps can affect the effectiveness of the oil damper. Gas bubbles can explosively collapse under positive pressure causing cavitation erosion of adjacent metal surfaces. Gas bubbles can also degrade the oil density and the capacity of the pressurized oil film to support loads with the oil filled annulus. Improvement is thus desirable.

SUMMARY

In accordance with a general aspect, there is provided an oil damper for supporting a shaft rotating about an axis, the oil damper comprising: an annulus radially defined between a structural support and a bearing housing; a pair of piston rings between the structural support and the bearing housing, the piston rings defining axial boundaries of the annulus; an oil inlet between the pair of piston rings, the oil inlet being in communication with a source of pressurized oil; and an oil seal axially spaced from each piston ring defining an annular oil reservoir external to each piston ring, the oil seal configured to act as a one-way check valve to impede intrusion of ambient gas into the oil reservoir while allowing extrusion from the oil reservoir in a direction away from the piston rings.

In accordance with another general aspect, there is provided an oil film damper for supporting a shaft rotating about an axis and for accommodating radial movement of a bearing housing relative to a structural support. The oil film damper includes an annulus radially defined between the structural support and the bearing housing and a pair of piston rings between the structural support and the bearing housing. The piston rings define the axial boundaries of the oil annulus. An oil inlet is disposed between the pair of piston rings, and is in communication with a source of pressurized oil. An oil seal is axially spaced from each piston ring defining an annular oil reservoir external to each piston ring. The oil seal has a seal lip resiliently biased against a contact surface to impede intrusion of ambient gas into the reservoir and to permit extrusion of gas and oil from the reservoir between the seal lip and contact surface. Pressure differentials between the oil and ambient gas may exist and the oil seal acts as a one way check valve to impede gas incursion into the oil reservoir and oil filled annulus.

Further described is a gas turbine engine including an oil film damper for supporting an engine shaft rotating about an engine axis and for accommodating radial movement of a bearing housing relative to a structural support.

Further details of these and other aspects of the subject matter of this application will be apparent from the detailed description included below and the drawings.

DESCRIPTION OF THE DRAWINGS

FIG. 3 is a detail axial sectional view through a piston ring and oil seal defining an oil reservoir to impede gas intrusion into the oil film annulus beyond the piston ring.

DETAILED DESCRIPTION

Figure 1:
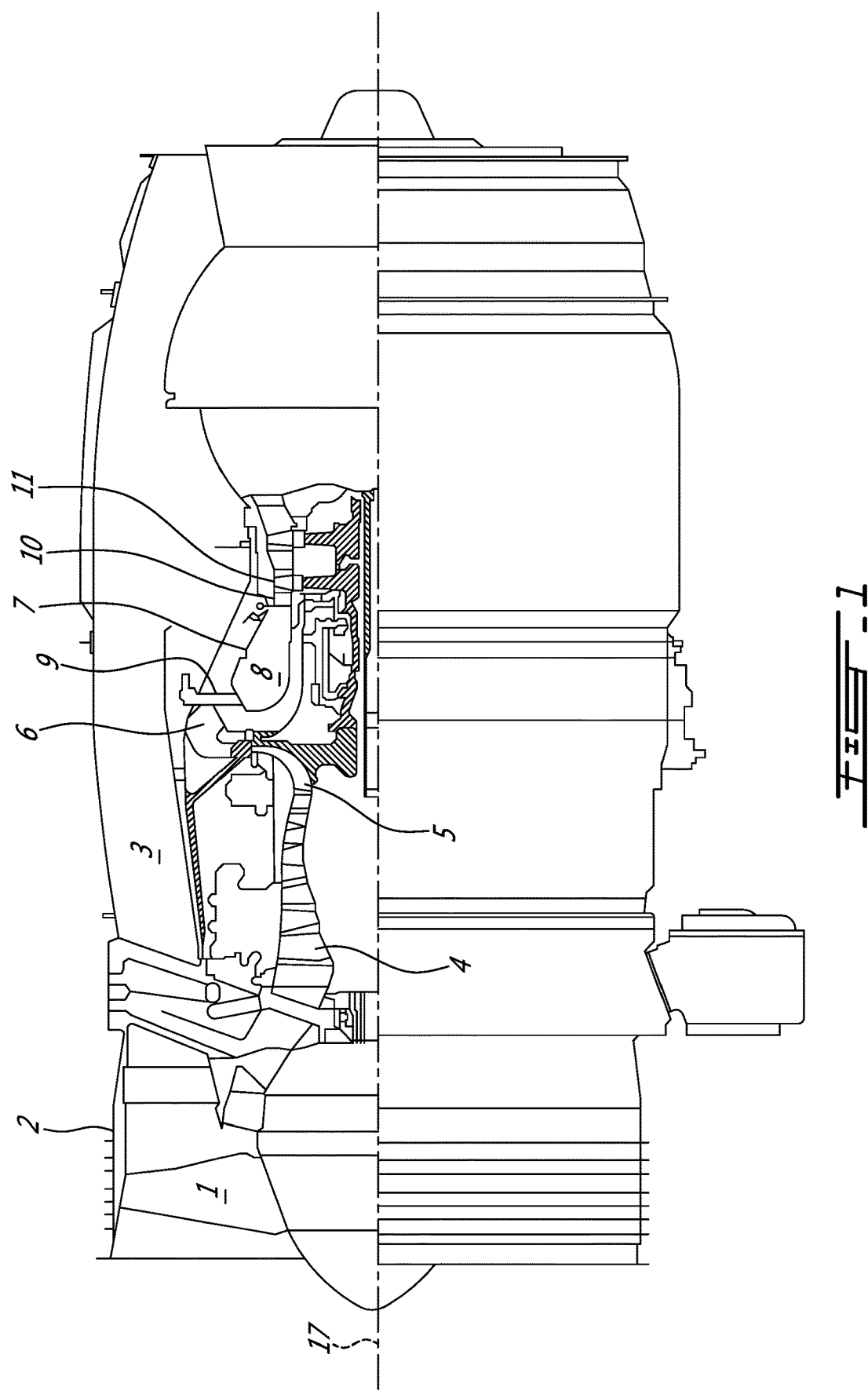
FIG. 1 shows an axial cross-section view of a turbo-fan gas turbine engine.

FIG. 1 shows an axial cross-section through an example turbo-fan gas turbine engine. However, it is understood that the features of the present disclosure are applicable to all type of gas turbine engines, including turboprops, turboshafts and auxiliary power units. Air intake into the engine passes over fan blades 1 in a fan case 2 and is then split into an outer annular flow through the bypass duct 3 and an inner flow through the low-pressure axial compressor 4 and high-pressure centrifugal compressor 5. Compressed air exits the compressor 5 through a diffuser 6 and is contained within a plenum 7 that surrounds the combustor 8. Fuel is supplied to the combustor 8 through fuel tubes 9 and fuel is mixed with air from the plenum 7 when sprayed through nozzles into the combustor 8 as a fuel air mixture that is ignited. A portion of the compressed air within the plenum 7 is admitted into the combustor 8 through orifices in the side walls to create a cooling air curtain along the combustor walls or is used for cooling to eventually mix with the hot gases from the combustor and pass over the nozzle guide vane 10 and turbines 11 before exiting the tail of the engine as exhaust.

Figure 2:
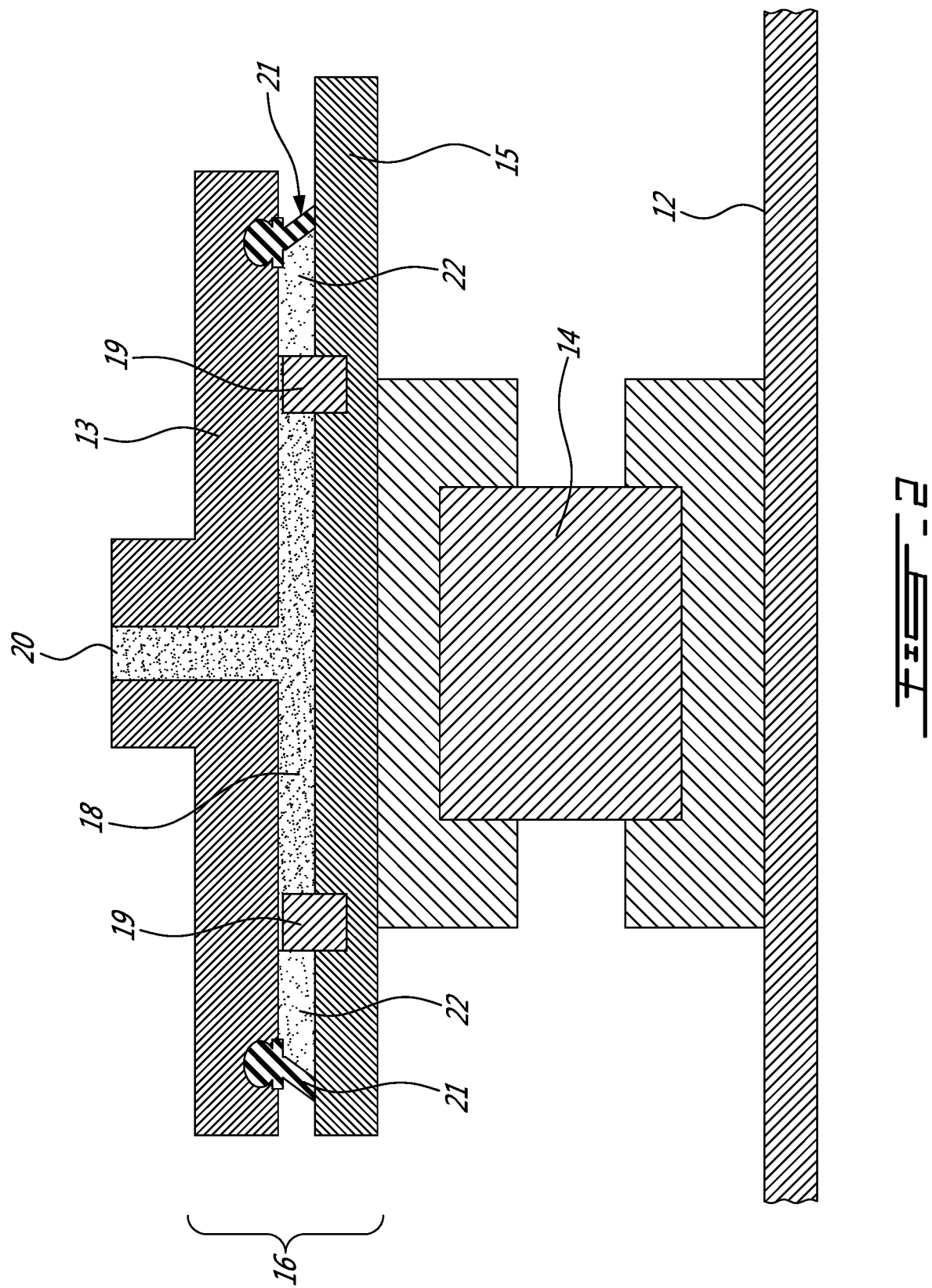
FIG. 2 is a detail axial sectional view through an oil film damper, the associated engine shaft, bearings and bearing housing.

With reference to FIGS. 1-2, a rotating shaft 12 of the engine is supported to rotate about the engine axis 17 with various radially extending structural supports 13 and bearings 14 within a bearing housing 15 (or a squirrel cage). As shown in the detail axial sectional view FIG. 2, an oil film damper 16 is provided for supporting the shaft 12 to rotate about the engine axis 17 (FIG. 1) and for accommodating radial movement of a bearing housing 15 relative to a structural support 13, for example radially extending struts.

The oil film damper 16 provides an oil filled annulus 18 radially defined between the structural support 13 and the bearing housing 15. In the example shown, the structural support 13 and the bearing housing 15 are illustrated as coaxial cylindrical bodies. A pair of axially spaced-apart piston rings 19 is provided between the structural support 13 and the bearing housing 15. The rings 19 define the axial boundaries of the oil filled annulus 18. An oil inlet 20 is located between the pair of piston rings 19 to fill and maintain an oil film within the annulus 18. The oil inlet 20 is in communication with a source of pressurized oil such as the engine oil pump and oil circulation system.

A flexible oil seal 21 is axially spaced from each piston ring 19 (i.e.: axially fore and aft) and extends between the structural support 13 and the bearing housing 15. The oil seals 21 serve primarily to impede ambient gas intrusion into the oil contained within the oil filled annulus 18 and also assist in containing the oil in conjunction with the piston rings 19.

The oil seals 21 define an annular oil filled reservoir 22 external to each piston ring 19. As best seen in the detail of FIG. 3, the oil seal 21 has a seal lip 23 resiliently biased against a contact surface, for example on the bearing housing 15. The oil seals 21 serve to impede intrusion of ambient gas into the oil reservoir 22 by providing a one way check valve. The oil seals 21 permit the extrusion of excess oil and any gas from within the reservoir 22 between the seal lip 23 and contact surface. Of course the oil seal 21 could be reversed in orientation to seal against a contact surface on the structural support 13. Neither the structural support 13 nor the bearing housing 15 are circumferentially rotating components but the bearing housing 15 merely floats radially relative to the stationary structural support 13. The oil film damper 16 permits relative radial movement between the structural support 13 and the bearing housing 15 cushioned by the pressurized oil within the oil filled annulus 18 and contained by the piston rings 19.

Those skilled in the art will appreciate that the oil filled annulus 18 contains pressurized oil due to a constant pressurized oil flow one way from the oil inlet 20 and flow resistance to oil escape is provided by the restricted gap about the piston rings 19. However the bearing housing 15 moves radially relative to the structural support 13 as a result of imbalance conditions such as bird strikes, blade failure, residual weight imbalance or shaft misalignment. The gap between the piston rings 19 and the adjacent surface 13 can increase or decrease depending on the imbalance condition. The pressure of oil contained within the oil filled annulus 18 also varies (relative to ambient gas pressure outside the piston rings 19) due to the radial motion. Accordingly some oil escapes past the piston rings 19 and lost oil is replaced by constant flow of pressurized oil via the oil inlet 20. The flow of oil from the oil inlet 20 and past the piston rings 19 purges the oil filled annulus and flows under pressure out through restricted gaps about the piston rings 19. As the shaft 12 rotates under an imbalanced condition, a positive pressure is created in the oil filled annulus 18 in advance of the eccentrically rotating shaft 12 (as the radial dimension of the annulus 18 is reduced) and a negative pressure follows the eccentrically rotating shaft 12 (as the radial dimension of the annulus 18 is increased).

Inevitably there is a gap about the piston rings 19 under imbalance conditions and a pressure differential between the ambient gas and the oil filled annulus 18 may allow gas intrusion into the oil filled annulus 18 to form bubbles. Such bubbles of gas can explosively collapse under positive pressure and create cavitation damage to the interior surfaces bounding the oil filled annulus 18. The purging of the oil filled annulus 18 by constant one way flow of oil from the oil inlet 20 and through gaps about the piston rings 19 somewhat serves to carry the gas bubbles along with the escaping oil. The provision of a one way check valve in the form of the oil seals 21 and an oil filled reservoir 22 external to the piston rings 19 impedes ambient gas intrusion into the oil filled annulus 18.

As seen in FIG. 3, the oil seal 21 may have a canted outer surface 24 relative to the contact surface engaging the seal lip 23. The canted outer surface 24 is exposed to ambient gas which serves to compress the seal lip 23 of the oil seal 21 against the contact surface. The oil seal 21 is made of resilient material and is biased to seal against the contact surface. When oil pressure within the oil filled reservoir 22 is in excess of the ambient gas pressure, with a pressure differential sufficient to overcome the resilient force of the oil seal 21 pressing the seal lip 23 against the contact surface, then oil and gas can escape from the oil filled reservoir 22. When the pressure differential is not sufficient to overcome the resilient force of the oil seal 21 pressing the seal lip 23 against the contact surface, then gas cannot enter the oil filled reservoir 22, and hence the resilient oil seal 21 serves as a one way check valve.

The oil seal 21 may also have a canted inner surface 25 relative to the contact surface. The canted inner surface 25 is exposed to oil within the annular oil filled reservoir 22. The force of pressurized oil against the canted inner surface 25 will have a resultant force component that rotates the oil seal 21 in a counterclockwise direction as drawn in FIG. 3 which lifts the seal lip 23 from the contact surface. The opposing force of ambient gas pressure against the canted outer surface 24 will have a resultant force component that rotates the oil seal 21 in a clockwise direction as drawn in FIG. 3 which pushes the seal lip 23 toward the contact surface.

The oil seal 21 shown in FIG. 3 may have a bevelled seal lip 23 which provides a planar contact with the mating contact surface. It will be understood that various configurations of seal lips 23 could be provided as alternatives such as serrated ridges or curved mating surfaces.

The oil seal 21 shown in FIG. 3 may have a base ring 26 opposite the seal lip 23 at a stationary end to secure the resilient oil seal 21 to the structural support 13 or alternatively to the bearing housing 15. The base ring 26 is embedded in a groove disposed in the structural support 13 in the example illustrated but can equally be disposed in a groove in the bearing housing 15 to seal against the structural support 13. It can also be sandwiched between support 13 and base ring 26. Various mounting assemblies are contemplated.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. An oil damper for supporting a shaft rotating about an axis, the oil damper comprising:
   an oil filled annulus radially defined between a structural support and a bearing housing;
   a pair of sealing rings between the structural support and the bearing housing, the sealing rings defining axial boundaries of the oil filled annulus, the oil contained in the oil filled annulus by the pair of sealing rings;

an oil inlet between the pair of sealing rings, the oil inlet being in communication with a source of pressurized oil; and an oil seal axially spaced from each sealing ring defining an annular oil reservoir external to each sealing ring, the oil seal configured to act as a one-way check valve to impede intrusion of ambient gas into the annular oil reservoir while allowing extrusion from the annular oil reservoir in a direction away from the sealing rings.

2. The oil damper according to claim 1, wherein the oil seal has a seal lip resiliently biased against a contact surface.

3. The oil damper according to claim 2, wherein the oil seal has a canted or curved outer surface relative to the contact surface, the canted or curved outer surface being exposed to ambient gas.

4. The oil damper according to claim 2, wherein the oil seal has a canted or curved inner surface relative to the contact surface, the canted or curved inner surface being exposed to oil within the annular oil reservoir.

5. The oil damper according to claim 2, wherein the oil seal has a bevelled seal lip.

6. The oil damper according to claim 2, wherein the oil seal has a base ring opposite the seal lip and the base ring is embedded in a groove disposed in a first one of: the structural support and the bearing housing.

7. The oil damper according to 6, wherein the contact surface is provided on a second one of the structural support and the bearing housing.

8. An oil film damper for supporting a shaft rotating about an axis and for accommodating radial movement of a bearing housing relative to a structural support, the damper comprising:

an oil-filled annulus radially defined between the structural support and the bearing housing;

a pair of sealing rings between the structural support and the bearing housing and the sealing rings defining axial boundaries of the oil filled annulus, the oil contained in the oil filled annulus by the pair of sealing rings;

an oil inlet between the pair of sealing rings, the oil inlet being in communication with a source of pressurized oil; and an oil seal axially spaced from each sealing ring defining an annular oil reservoir external to each sealing ring, the oil seal having a seal lip resiliently biased against a contact surface to impede intrusion of ambient gas into the oil reservoir and to permit extrusion from the oil reservoir between the seal lip and contact surface.

9. The oil film damper according to claim 8 wherein the oil seal has a canted or curved outer surface relative to the contact surface, the canted or curved outer surface being exposed to ambient gas.

10. The oil film damper according to claim 8 wherein the oil seal has a canted or curved inner surface relative to the contact surface, the canted or curved inner surface being exposed to oil within the annular oil reservoir.

11. The oil film damper according to claim 8 wherein the oil seal has a bevelled seal lip.

12. The oil film damper according to claim 8 wherein the oil seal has a base ring opposite the seal lip and the base ring is embedded in a groove disposed in one of: the structural support; and the bearing housing.

13. A gas turbine engine comprising:

an oil film damper for supporting an engine shaft rotating about an engine axis and for accommodating radial movement of a bearing housing relative to a structural support, the oil film damper comprising:

an oil filled annulus radially defined between the structural support and the bearing housing;

a pair of sealing rings between the structural support and the bearing housing and the sealing rings defining axial boundaries of the oil filled annulus, the oil contained in the oil filled annulus by the pair of sealing rings;

an oil inlet between the pair of sealing rings, the oil inlet being in communication with a source of pressurized oil; and an oil seal axially spaced from each sealing ring defining an annular oil filled reservoir external to each sealing ring, the oil seal having a seal lip resiliently biased against a contact surface to impede intrusion of ambient gas into the reservoir and to permit extrusion from the reservoir between the seal lip and contact surface.

14. The gas turbine engine according to claim 13 wherein the oil seal has a canted or curved outer surface relative to the contact surface, the canted or curved outer surface being exposed to ambient gas.

15. The gas turbine engine according to claim 13 wherein the oil seal has a canted or curved inner surface relative to the contact surface, the canted or curved inner surface being exposed to oil within the annular oil filled reservoir.

16. The gas turbine engine according to claim 13 wherein the oil seal has a bevelled seal lip.

17. The gas turbine engine according to claim 13 wherein the oil seal has a base ring opposite the seal lip and the base ring is embedded in a groove disposed in one of: the structural support, and the bearing housing.

18. The gas turbine engine according to claim 13, wherein the oil seal has a base ring opposite the seal lip and the base ring is mounted to one of the structural support and the bearing housing.

19. The gas turbine engine according to claim 13, wherein the oil seal has a flat or curved seal lip.

* * * * *